(12) United States Patent
Kim

(10) Patent No.: US 6,931,065 B2
(45) Date of Patent: Aug. 16, 2005

(54) APPARATUS AND METHOD FOR MOTION DETECTION OF IMAGE IN DIGITAL VIDEO RECORDING SYSTEM USING MPEG VIDEO COMPRESSION

(75) Inventor: Ki Jin Kim, Gyeonggi-do (KR)

(73) Assignee: Penta Micro Inc., Seoul (KR)

( * ) Notice: Subject to any disclaimer, the term of this patent is extended or adjusted under 35 U.S.C. 154(b) by 380 days.

(21) Appl. No.: 10/330,350

(22) Filed: Dec. 30, 2002

(65) Prior Publication Data

US 2003/0123551 A1 Jul. 3, 2003

(30) Foreign Application Priority Data

Dec. 31, 2001 (KR) .................................. 10-2001-0089028

(51) Int. Cl.$^7$ ............................................... H04B 1/66
(52) U.S. Cl. ........................ 375/240.16; 375/240.12; 375/240.26; 375/240.25; 375/240.14; 382/233; 382/236; 382/238; 382/232; 348/699
(58) Field of Search ................... 375/240.16, 240.12, 375/240.26, 240.25, 240.14; 348/699; 382/233, 236, 238, 232

(56) References Cited

U.S. PATENT DOCUMENTS 5,438,374 A  *  8/1995  Yan .............................. 348/620
5,627,601 A  *  5/1997  Ran et al. .................... 348/699
6,084,908 A  *  7/2000  Chiang et al. ......... 375/240.03

* cited by examiner

Primary Examiner—Shawn S. An
(74) Attorney, Agent, or Firm—Venable LLP; Michael A. Sartori

(57) ABSTRACT

Provided are apparatus and method for precise motion detection in a digital video recording (DVR) system using a Moving Picture Expert Group (MPEG) video compression technique and a computer-readable recording medium for recording a program that implements the method. The motion detection apparatus performs motion detection by using a motion vector generated in the MPEG video compression process. The motion detection apparatus includes: a motion estimation unit for receiving a reference image frame and a current image frame, and estimating a motion vector (MV=(mx,my)) for a motion of an object; a motion compensation unit for calculating a motion compensated prediction error $E_{MV}(i)$ based on the estimated motion vector (MV=(mx,my)); a frame difference calculation unit for calculating a frame difference between the reference image frame and the current image frame; a motion block accumulation unit for accumulating the number ($B_{motion}$) of motion blocks in the current image frame based on the motion compensated prediction error $E_{MV}(i)$ and the frame difference $E_0(i)$; and a motion frame determination unit for determining whether the current image frame has a motion, based on the accumulated number $B_{motion}$ of motion blocks.

13 Claims, 7 Drawing Sheets

APPARATUS AND METHOD FOR MOTION DETECTION OF IMAGE IN DIGITAL VIDEO RECORDING SYSTEM USING MPEG VIDEO COMPRESSION

FIELD OF THE INVENTION

The present invention relates to a motion detection technology; and, more particularly, to a motion detection apparatus that can detect a motion precisely in a digital video recording (DVR) system using an MPEG video compression technique, a method thereof, and a computer-readable recording medium for recording a program that implements the method.

DESCRIPTION OF RELATED ART

A digital video recording (DVR) system sets up a plurality of cameras in an area that requires security, monitors and records the area. The system keeps watch on the area, searches the records of the area based on time, date, cameras and events, performs data back-up and controls the cameras from a remote place in real-time, which are impossible in a conventional analogue closed-circuit television (CCTV) system. The video compression skill, which is the core technology in the digital video storage field, such as DVR, has been made a great progress from H.261 to MPEG-4.

However, due to the large amount of data generated in the video compression process, it has been troublesome to apply the high-quality video compression technique to application fields, where video data should be stored in a limited capacity of hard disk. Also, in a dark environment, or at night, the compression efficiency of the video compression technique is deteriorated due to the analogue noise generated in the cameras, and the degraded correlation of video data raises a problem that the amount of data are generated at night is larger than those generated in the daytime.

To solve this problem, motion detection methods have been suggested, conventionally. A conventional motion detection method determines whether an object is moved or not in an image frame among consecutive image frames of a video, and if the image frame has no object motion, it is not recorded. The conventional method measures the change in an object, i.e., a motion, and the changes in brightness and colors. If the measured value goes over a certain threshold value, the image frame is determined to have a motion in the image frame, and then recorded as a motion frame. This method has an advantage that it can reduce the amount of data recorded at night when motions are generated relatively less than in the daytime.

Therefore, the motion detection method is known to be effective, especially at night when relatively few motions occur, if it is applied to the DVR system, which performs watching on an area and records the watched video data all through the day.

In the conventional motion detection method, the change of brightness in a particular area is detected from consecutive image frames. If the brightness difference value between the target image frame (i.e., current image frame) and the preceding image frame (i.e., the reference image frame) is larger than a predetermined threshold value, the current image frame is determined to be a motion frame.

This method, in which the occurrence of a motion is determined based on the brightness difference between the consecutive image frames, does not have any big problem in the daytime when relatively little noise is generated. However, in a dark environment, or at night, when noise is generated much, an image frame without any motion used to be determined as a motion frame. This drops the utility efficiency of a storage device, such as a hard disk. In short, in many cases, the conventional method would misjudge an image frame without a motion as one having a motion in a dark environment due to the noise generated in the image frame and thus record unnecessary image frames.

If the threshold value is raised in the hope of solving the problem, more serious problem can be brought, such as determining a motion frame as a frame without a motion, and thereby not recording the image data that should be recorded.

Therefore, to avoid the above problems, a motion should be detected not only by the simple change in brightness, but also by estimating a real motion vector as well.

Meanwhile, a video compression/transmission system that uses a Moving Picture Expert Group (MPEG) encoding technique, which is a high-quality video compression technology, includes a motion estimation technique to perform the compression and transmission of an image frame more effectively.

That is, according to the MPEG standard, the amount of data can be reduced by estimating a motion vector based on the current image frame and the reference image frame to effectively compress the input image frame, estimating an object motion in the current image frame based on the estimated motion vector, and then using the difference between the estimated image frame and the current image frame, which is a motion compensation error.

However, in order to divide an image frame into small areas, e.g., blocks or macroblocks, and perform motion estimation with respect to the areas, the conventional DVR system requires a separate motion estimator as well as a motion detection apparatus that can determine whether there is a motion or not based on the motion vector of an object. In case where the motion estimator and motion detection apparatus are embodied in hardware, a large-size motion detection apparatus and a motion estimator tens of times as big as the motion detection apparatus should be added. Therefore, it is troublesome to apply the motion estimator and motion detection apparatus using a motion vector to the conventional DVR system.

Although the motion estimator and motion detection apparatus using a motion vector are embodied in the form of software, it is still hard to apply them to the conventional DVR system, because the motion estimator gives a lot of loads to the CPU of the DVR system.

Another motion detection method, which is commonly used, estimates a motion vector by searching a reference image frame for a block having a brightness value least different from the brightness value of a block of the current image frame, in which a motion is to be estimated, and then determines if there is any motion based on whether the size of the estimated vector exceeds a predetermined threshold value.

Since the above motion vector estimation method simply searches for a block whose brightness value is least different from the particular block of the current image frame, it cannot reflect the real motion of an object precisely, when it estimates a motion vector. If the occurrence of a motion is determined based on the motion vector which may have been estimated wrongly, it is impossible to determine whether the image frame actually contains an object motion, precisely either. This problem gets worse in a dark environment where more noise is included in an image frame than in the daytime.

SUMMARY OF THE INVENTION

It is, therefore, an object of the present invention to provide an apparatus and method for detecting a motion of an image frame based on a motion vector generated in a Moving Picture Expert Group (MPEG) image compression process, and a computer-readable recording medium for recording a program that implements the method.

It is another object of the present invention to provide a motion detection apparatus that can detect a motion precisely even in a dark environment by using a motion compensated prediction error based on a motion vector and an prediction error when it is assumed that there is no motion, in order to determine whether there is a motion or not, a method thereof, and a computer-readable recording medium for recording a program that implements the method.

It is another object of the present invention to provide a motion detection apparatus that can detect the occurrence of a motion even when a motion is made all of sudden, that is, when the image frame without a motion has been set as a reference image frame and the motion frame is set as an input image frame, a method thereof, and a computer-readable recording medium for recording a program that implements the method.

It is another object of the present invention to provide a motion detection apparatus that performs motion detection more effectively by putting a weight on each error so as to consider the characteristics and environment of a video, a method thereof, and a computer-readable recording medium for recording a program that implements the method.

It is another object of the present invention to provide a digital video recording (DVR) system, in which the motion detection apparatus and method are embodied.

In accordance with an aspect of the present invention, there is provided an apparatus for detecting a motion of an image frame in a digital video recording system having a Moving Picture Expert Group (MPEG) video compression apparatus, comprising: a motion estimation unit for receiving a reference image frame and a current image frame, and estimating a motion vector (MV=(mx,my)) with respect to a motion of an object in the motion detection area of the image frames based on the received reference image frame and the current image frame; a motion compensation unit for calculating a motion compensated prediction error $E_{MV}(i)$ based on the estimated motion vector (MV=(mx,my)); a frame difference calculation unit for calculating a frame difference ($E_0(i)$) which is a difference between the reference image frame and the current image frame, the frame difference being an error without motion compensation, with respect to all the blocks included in the motion detection area of the reference image frame, which is not motion-compensated, and the current image frame; a motion block accumulation unit for accumulating the number ($B_{motion}$) of motion blocks in the current image frame by determining whether a block has a motion or not based on the motion compensated prediction error $E_{MV}(i)$ and the frame difference $E_0(i)$; and a motion frame determination unit for determining whether the current image frame has a motion or not, based on the accumulated number $B_{motion}$ of motion blocks.

In accordance with another aspect of the present invention, there is provided a digital video recording system, comprising a motion detection apparatus, wherein the motion detection apparatus includes a motion estimation unit for receiving a reference image frame and a current image frame, and estimating a motion vector (MV=(mx, my)) with respect to a motion of an object in the motion detection area of the image frames based on the received reference image frame and the current image frame; a motion compensation unit for calculating a motion compensated prediction error $E_{MV}(i)$ based on the estimated motion vector (MV=(mx,my)); a frame difference calculation unit for calculating a frame difference ($E_0(i)$) which is a difference between the reference image frame and the current image frame, the frame difference being an error without motion compensation, with respect to all the blocks included in the motion detection area of the reference image frame, which is not motion-compensated, and the current image frame; a motion block accumulation unit for accumulating the number ($B_{motion}$) of motion blocks in the current image frame by determining whether a block has a motion or not based on the motion compensated prediction error $E_{MV}(i)$ and the frame difference $E_0(i)$; and a motion frame determination unit for determining whether the current image frame has a motion or not, based on the accumulated number $B_{motion}$ of motion blocks, wherein an image frame determined to have a motion is compressed/recorded by the motion frame determination unit in the MPEG video compression technique.

In accordance with another aspect of the present invention, there is provided a method for detecting a motion of an image frame in a digital video recording system having an MPEG video compression apparatus, comprising the steps of: a) estimating a motion vector (MV=(mx,my)) with respect to a motion of an object in a reference image frame and a current image frame; b) calculating a motion compensated prediction error $E_{MV}(i)$ based on the estimated motion vector (MV=(mx,my)); c) calculating a frame difference ($E_0(i)$) which is a difference between the reference image frame and the current image frame, which is an error without motion compensation, with respect to all the blocks in the motion detection area of the reference image frame, which is not motion-compensated, and the current image frame; d) multiplying a predetermined motion weight $W_{MV}$ to the motion compensated prediction error $E_{MV}(i)$ and multiplying a still weight $W_0$ to the frame difference $E_0(i)$; e) comparing the motion compensated prediction error $E_{MV}(i)$, which is obtained by multiplying the motion weight $W_{MV}$, and the frame difference $E_0(i)$, which is obtained by multiplying the still weight $W_0$; f) accumulating the number $B_{motion}$ of motion blocks, if the weighted $W_{MV}$ motion compensated prediction error $E_{MV}(i)$ is smaller than the weighted $W_0$ frame difference $E_0(i)$; g) repeating the steps a) through e) with respect to a block in the motion detection area of the current image frame; and h) if the accumulated number $B_{motion}$ of the motion blocks is larger than a predetermined threshold value $T_{motion}$, determining the current image frame as a motion frame, or otherwise, determining the current image frame as a still image frame.

In accordance with another aspect of the present invention, there is provided a computer-readable recording medium for recording a program that implements a motion detection method to detect a motion in an input image frame in a digital video recording system provided with a processor and an MPEG video compression apparatus, comprising the steps of: a) estimating a motion vector (MV=(mx,my)) with respect to a motion of an object in a reference image frame and the current image frame; b) calculating a motion compensated prediction error $E_{MV}(i)$ based on the estimated motion vector (MV=(mx,my)); c) receiving the reference image frame and the current image frame, and calculating a frame difference $E_0(i)$, which is an error without motion compensation, with respect to all the blocks in the motion detection area of the reference image frame, which is not motion-compensated, and the current image frame; d) multiplying a predetermined motion weight $W_{MV}$ to the motion compensated prediction error $E_{MV}(i)$ and multiplying a still weight $W_0$ to the frame difference $E_0(i)$; e) comparing the motion compensated prediction error $E_{MV}(i)$, which is obtained by multiplying the motion weight $W_{MV}$, and the frame difference $E_0(i)$, which is obtained by multiplying the still weight $W_0$; f) accumulating the number $B_{motion}$ of motion blocks, if the weighted $W_{MV}$ motion compensated prediction error $E_{MV}(i)$ is smaller than the weighted $W_0$ frame difference $E_0(i)$; g) repeating the steps a) through e) with respect to a block in the motion detection area of the current image frame; and h) if the accumulated number $B_{motion}$ of the motion blocks is larger than a predetermined threshold value $T_{motion}$, determining the current image frame as a motion frame, or otherwise, determining the current image frame as a still image frame.

In accordance with another aspect of the present invention, it is possible to detect a motion by using a regular macro block-based motion vector, which is generated in the conventional MPEG video compression process.

In accordance with another aspect of the present invention, a motion can be detected precisely even in a dark environment by using a motion compensated prediction error based on a motion vector, and a prediction error when it is assumed that there is no motion, in order to determine whether there is a motion in a block.

In accordance with another aspect of the present invention, a motion can be detected, even when the motion is made all of sudden.

In accordance with another aspect of the present invention, the motion detection can be performed more effectively by putting a weight on each error so that the characteristics and environment of a video could be considered.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Figure 1:
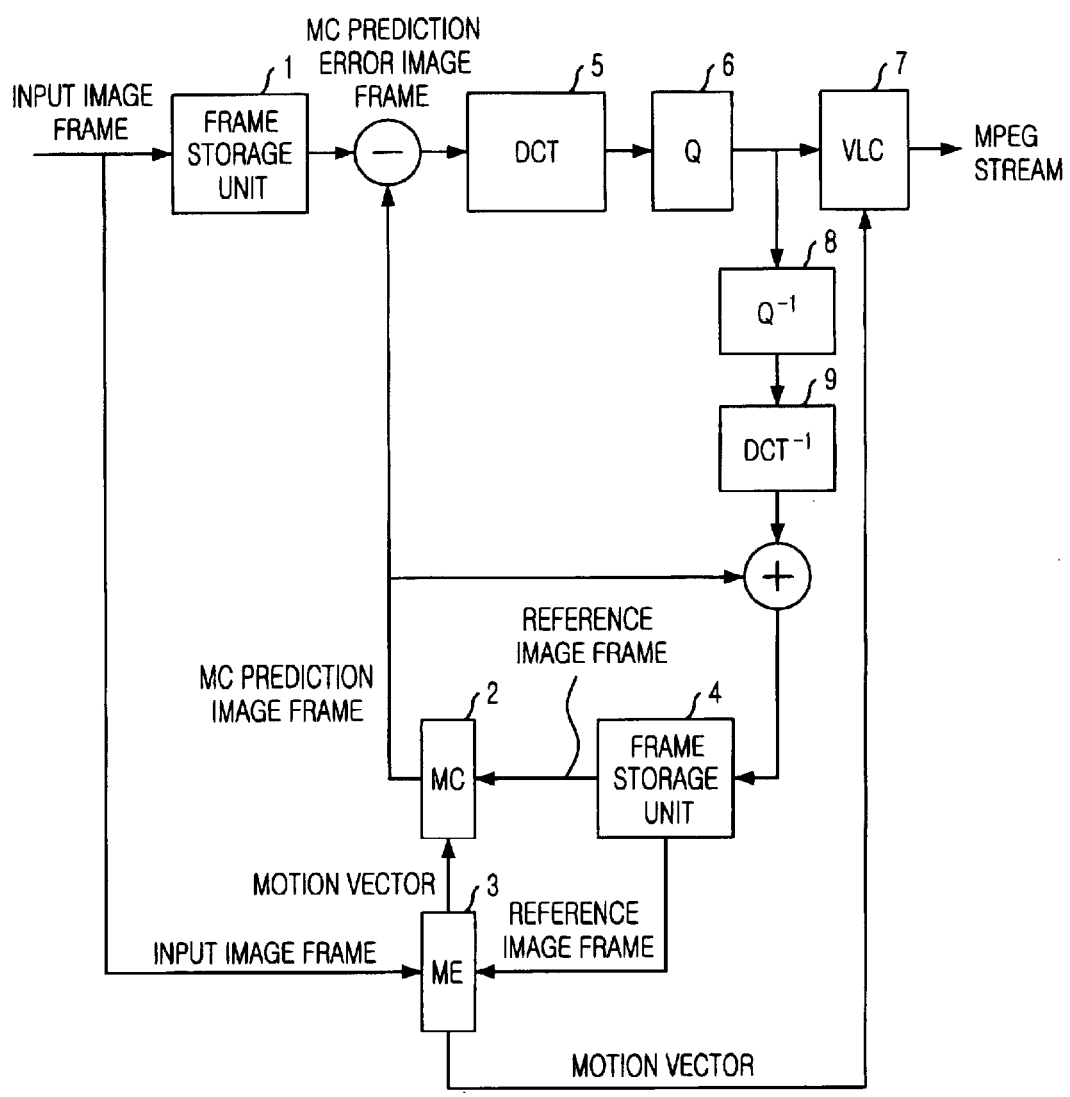
FIG. 1 is a block diagram showing a structure of an MPEG video compression device.

Other objects and aspects of the invention will become apparent from the following description of the embodiments with reference to the accompanying drawings, which is set forth hereinafter. The same reference numerals are given to the same structural elements, although they appear in different drawings.

FIG. 1 is a block diagram showing a structure of an MPEG video compression device. The MPEG video compression device includes frame storage units 1 and 4, a motion compensation (MC) unit 2, a motion estimation (ME) unit 3, a discrete cosine transform (DCT) unit 5, a quantization (Q) unit 6, a variable length encoding (VLC) unit 7, an inverse quantization ($Q^{-1}$) unit 8 and an inverse DCT unit 9.

When a digital image frame is inputted, the motion estimation unit 3 estimates a motion vector on a macroblock by macroblock basis with reference to a reference image frame stored in the frame storage unit 4. How to estimate a motion vector is as defined in the Moving Picture Expert Group (MPEG) standard specification. Further description on the method of estimating a motion vector will be omitted, because it is out of the point of the present invention.

The motion vector estimated in the motion estimation unit 3 is transmitted to the MC unit 2. Then, the MC unit 2 compensates the motion by obtaining an estimated macro block from a location, which is moved as much as the motion vector from the current macro block, in the reference image frame stored in the frame storage unit 4. The motion compensation method is also defined in the MPEG standard specification, and any further description on the motion compensation method will be omitted, because it may mislead the point of the present invention, too.

The frame storage unit 1 stores the input image frame during the delay time for motion estimation and motion compensation. The difference value between the macro block of the input image frame, which has been stored in the frame storage unit 1, and the motion compensation-estimated macro block is compressed in the DCT unit 5 and the quantization unit 6.

The compressed data are transformed into an MPEG stream in the VLC unit 7 and then outputted. At the same time, the compressed data are restored through the inverse quantization unit 8 and inverse DCT unit 9, added to the motion compensated prediction data outputted from the MC unit 2, and stored in the frame storage unit 4 as a reference image frame for motion estimation and compensation for the next input video.

Figure 2:
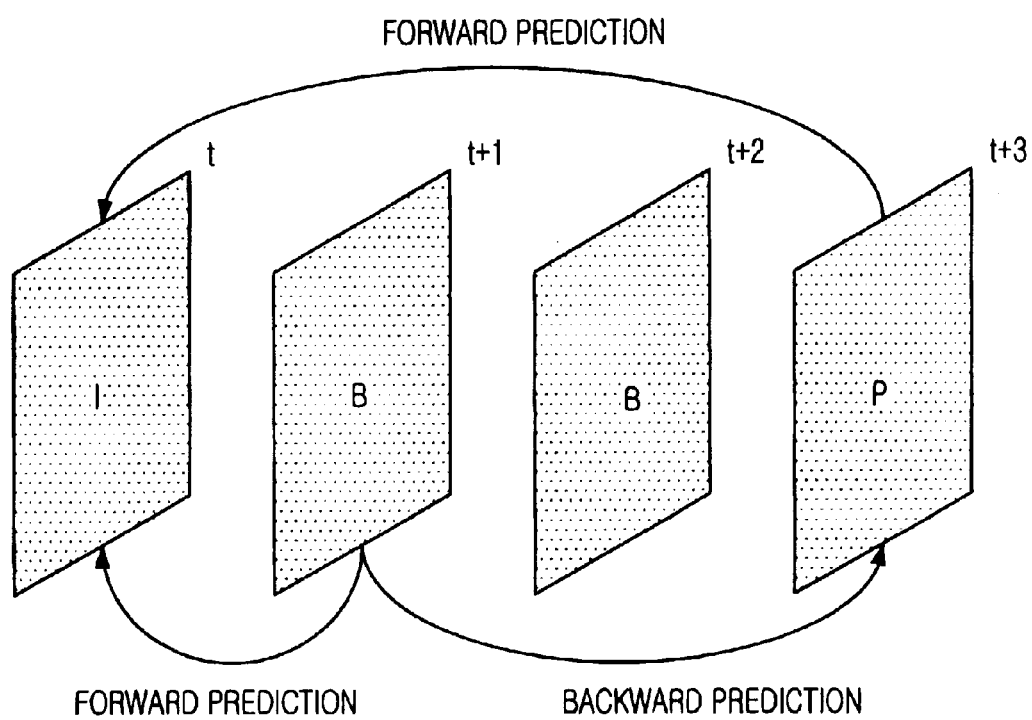
FIG. 2 is a diagram describing video encoding modes for MPEG video compression.

FIG. 2 is a diagram describing video encoding modes for MPEG video compression. In MPEG, the input videos are encoded in three forms, i.e., I-picture, P-picture and B-picture according to the establishment of a user. The I-picture is compressed by performing DCT and quantization on the data of the current image frame without using other image frames, i.e., intra encoding picture. The P-picture is compressed by performing motion compensation using the data of the I-picture or P-picture which has been encoded previously (e.g., the $t^{th}$ screen based on the $t+3^{th}$ P-picture in FIG. 2), and then performing DCT and quantization on the motion compensated prediction error. The B-picture is compressed by performing DCT and quantization on the motion compensated prediction error, which is obtained by using all the I-picture and P-picture located temporally before (e.g., the $t^{th}$ screen based on the $t+1^{th}$ B-picture) and after (e.g., the $t+3^{th}$ screen based on the $t+1^{th}$ B-picture in FIG. 2) the B-picture.

Among the three encoding modes, the I-picture cannot be used for motion detection, because it does not perform motion estimation. The B-picture also is not proper to be used for motion detection, since it has to estimate forward and backward motion vectors from the videos before and after the B-picture, and the backward motion vector is a vector estimated with respect to the video after the B-picture. Therefore, in the present invention, a motion is detected by using a motion compensated prediction error that is obtained from the P-picture.

Figure 3:
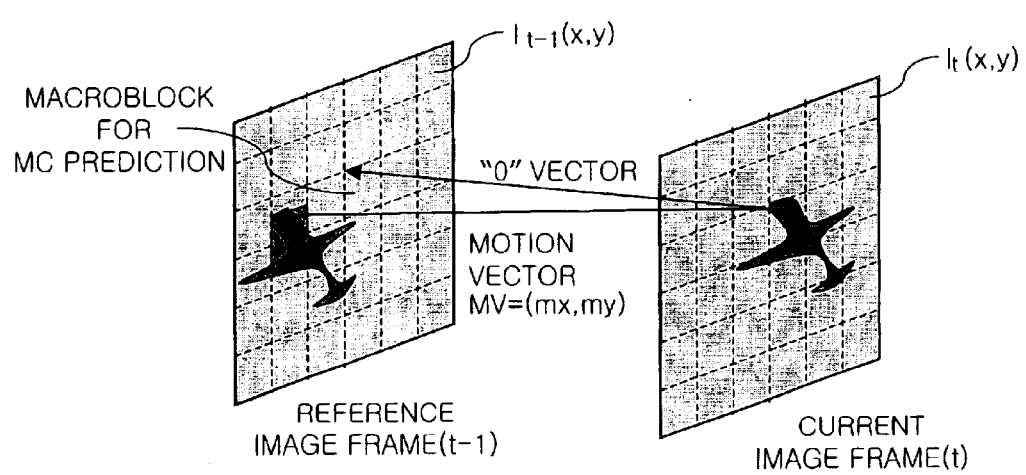
FIG. 3 is an exemplary diagram showing an estimation for a reference image frame whose motion is compensated by using a motion vector for the same location of the reference image frame in a consecutive two image frames in accordance with an embodiment of the present invention.

FIG. 3 is an exemplary diagram showing estimation for a reference image frame whose motion is compensated by using a motion vector for the same location of the reference image frame in a successive two video frame in accordance with an embodiment of the present invention.

Motion compensation in a small block area of the image frame is performed based on the reference image frame (t−1) and the current image frame (t). FIG. 3 shows a case where a motion occurs in the current block area. Following equations 1 and 2 show two prediction errors.

$$E_0(i) = \sum_{x,y=area} |I_t(x,y) - I_{t-1}(x,y)| \qquad \text{Eq. 1}$$

wherein $I_t(x,y)$ denotes the brightness of a pixel in the coordinates (x,y) of the $t^{th}$ image frame, and $I_{t-1}(x,y)$ denotes the brightness of a pixel in the coordinates (x,y) of the t−1$^{th}$ image frame, area being a motion estimation block.

In the equation 1, $E_0(i)$ stands for a prediction error, which will be referred to as 'frame difference,' herefrom, with respect to the block of the reference image frame (t−1) in the same location pointed by the "0" vector and the block of the current image frame (t), regardless of the motion vector with respect to the $i^{th}$ block. $E_0(i)$ is the summation of the error determinants at all the points in the block for motion compensated prediction.

$$E_{MV}(i) = \sum_{x,y=area} |I_t(x,y) - I_{t-1}(x-mx, y-my)| \qquad \text{Eq. 2}$$

wherein $I_t(x,y)$ denotes the brightness of a pixel in the coordinates (x,y) of the $t^{th}$ video, and $I_{t-1}(x-mx,y-mx)$ denotes the brightness of a pixel in the coordinates moved as much as the motion vector MV=(mx,my) from the location (x,y) of the t−1$^{th}$ video, area being a motion estimation block.

In the equation 2, $E_{MV}(i)$ stands for a motion compensated prediction error based on the motion vector MV=(mx,my) obtained by performing motion estimation with respect to the $i^{th}$ block. That is, $E_{MV}(i)$ is the summation of the error determinants at all the points in the block for motion compensated prediction in the current image frame (t) and the block of the reference image frame (t−1), which is motion-compensated, after the object in the reference image frame (t−1) is moved by performing compensation on the reference image frame (t−1) based on a motion vector.

Referring to FIG. 3, since the object of the image frame is moved, if estimation is performed in the same location of the reference image frame (t−1) without considering a motion, that is, if the error between the reference image frame (t−1) without motion compensation and the current image frame (t) in which an object is moved is obtained based on a "0" vector, a large error is generated. When the error is obtained by using a motion vector, the error is generated small because the motion estimation and compensation is performed.

Therefore, the motion estimation and motion compensation methods can be used for motion detection by multiplying a weight to the two prediction errors, and if the weighted $E_{MV}(i)$ is smaller than the weighted $E_0(i)$, selecting the block as a motion block which means a block having a motion.

That is, the motion estimation and motion compensation methods that are used for effective video compression can be applied to a motion detection method to record a video effectively in a digital video recording (DVR) system.

Figure 4:
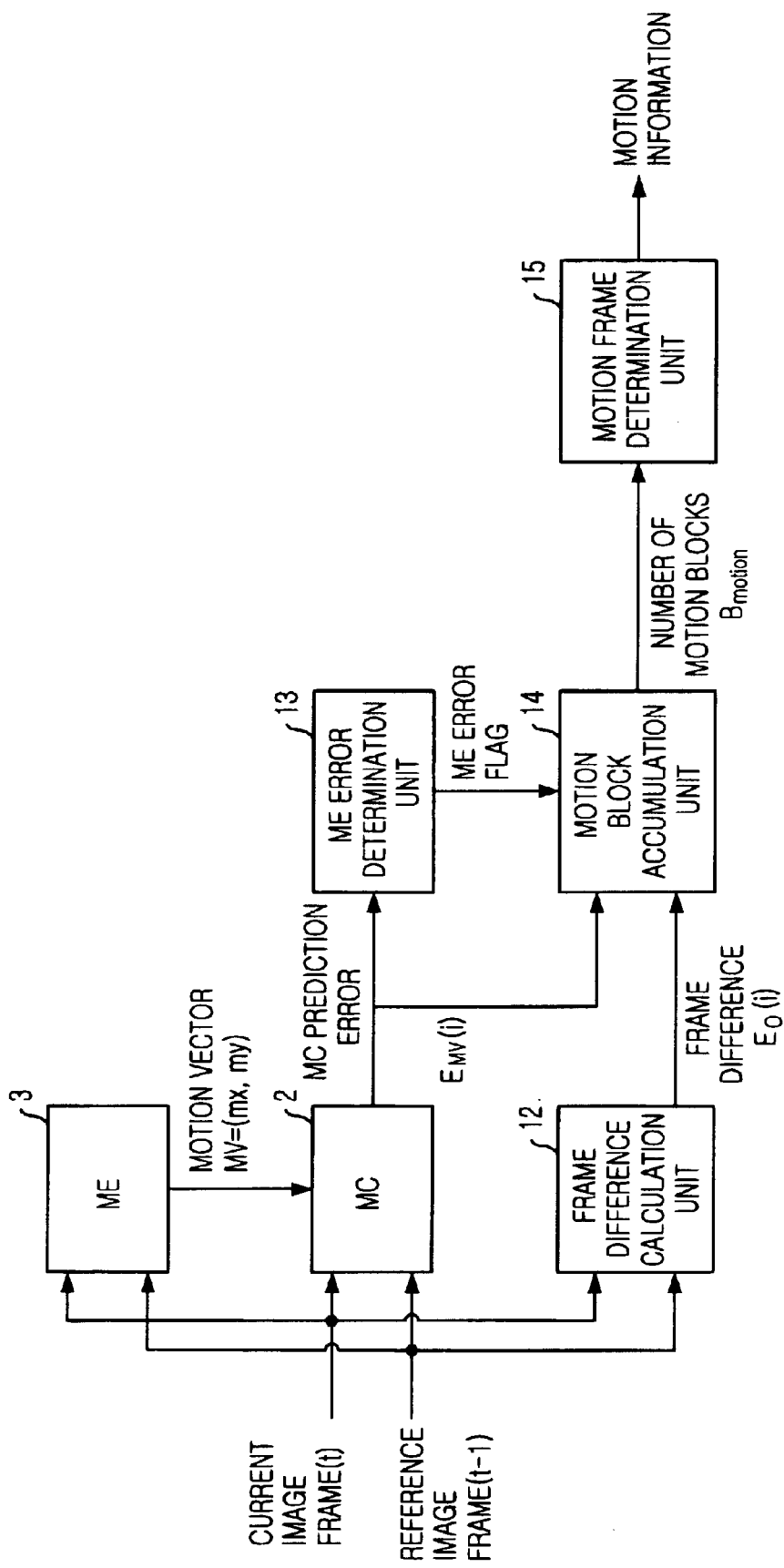
FIG. 4 is a block diagram illustrating a motion detection apparatus in a digital video recording (DVR) system in accordance with an embodiment of the present invention.

FIG. 4 is a block diagram illustrating a motion detection apparatus in a DVR system in accordance with an embodiment of the present invention. The motion detection apparatus includes: a motion compensation (MC) unit 2 for receiving a current image frame (t) and a reference input image frame (t−1), and obtaining a motion compensated prediction error $E_{MV}(i)$ based on a motion vector which is estimated from a motion estimation (ME) unit 3; a frame difference operation unit 12 for obtaining an error without motion compensation, i.e., frame reference $E_0(i)$ from the consecutive current image frame (t) and reference input image frame (t−1); a motion block accumulation unit 14 for determining whether a block has a motion by using the two errors $E_{MV}(i)$ and $E_0(i)$ and for accumulating the number of motion macro blocks; a motion estimation error determination unit 13 for detecting a motion estimation error block by using the motion compensation error, and outputting a motion estimation error flag to the motion block accumulation unit 14; and a motion frame determination unit 15 for determining if the current image frame (t) has a motion based on the total number of motion blocks within the current image frame (t) outputted from the motion block accumulation unit 14.

The ME unit 3 and the MC unit 2 are the same elements as shown in FIG. 1. The MC unit 2 calculates the motion compensated prediction error $E_{MV}(i)$ according to the equation 2 by using a motion vector MV=(mx,my) of a block estimated in the ME unit 3 and then transmits it to the motion block accumulation unit 14.

Meanwhile, the frame difference operation unit 12 calculates the frame difference $E_0(i)$, which is a prediction error that does not consider a motion vector, according to the equation 1 and transmits it to the motion block accumulation unit 14. Then, the motion block accumulation unit 14 receives the prediction errors $E_{MV}(i)$ and $E_0(i)$, determines whether the block is a motion block or not by comparing their weights, as described later, and according to the comparison result, accumulates the number $B_{motion}$ of motion blocks. The method for determining whether a block has a motion or not from the prediction errors $E_{MV}(i)$ and $E_0(i)$ is already described before.

The motion frame determination unit 15 uses the accumulated number $B_{motion}$ of motion blocks, obtained by the motion block accumulation unit 14 with respect to the entire motion detection area. If the number of motion blocks is larger than a threshold value $T_{motion}$ set by the user, the image frame is determined to be a motion image. The threshold value $T_{motion}$ is determined and inputted by the user in advance. Therefore, the two prediction errors, i.e., weighted $E_0(i)$ and weighted $E_{MV}(i)$, are compared with each other and used for motion detection. If the weighted $E_{MV}(i)$ is smaller than the weighted $E_0(i)$, the block is determined to be a motion block.

However, when the prediction errors, i.e., weighted $E_0(i)$ and weighted $E_{MV}(i)$ are compared simply with an image frame without a motion set as a reference image frame and a motion frame set as an input image frame, a large error is generated. For instance, if the state of no motion is continued and then suddenly a motion is detected (that is, when the image without any motion, i.e., 0, is changed into an image having a motion, i.e., 1, discontinuously), the reference image frame and the current image frame for motion estimation and compensation become to have a completely different characteristic. So, both of the motion compensation error $E_{MV}(i)$ and the error $E_0(i)$ without motion compensation, i.e., frame difference, come to have large values. Thus, the occurrence of a motion can hardly be detected precisely.

In short, if image frames without any motion is continued and then suddenly a motion occurs, the motion compensation error $E_{MV}(i)$ comes to have a very large value. At the same time, the prediction error (i.e., frame difference) $E_0(i)$ that does not consider a motion vector becomes to have a large value as well. So, when their weighted values are compared in the motion block accumulation unit 14, the difference between the two values is not that considerable. Therefore, the motion detection system misjudges that the block has no motion, failing to detect the motion that has actually occurred in the block.

The motion estimation error determination unit 13 is an element for determining again whether the block does not have any motion, when an image frame without any motion is set as a reference image frame and then an image with a lot of motions is set as an input image frame (that is, when a motion is made suddenly after a state of no motion is continued for a long time). It is determined whether the motion estimation is performed exactly by receiving only the motion compensated prediction error $E_{MV}(i)$ additionally from the motion estimation error determination unit 13.

That is, if the motion compensated prediction error $E_{MV}(i)$ is larger than a predetermined threshold value ($T_{MV\_error}$) in a block of the current image frame (t), the motion estimation error determination unit 13 determines that the block has a motion, and notifies the result to the motion block accumulation unit 14. The determination result signal transmitted from the motion estimation error determination unit 13 and the motion block accumulation unit 14 is a sort of an interrupt signal that makes the block as one having a motion, no matter what decision the motion block accumulation unit 14 has made on the block. In the motion block accumulation unit 14, the motion estimation error determination result notified by the motion estimation error determination unit 13 takes precedence over the determination on whether the block has a motion, which is made in the motion block accumulation unit 14. It disregards the result of the motion block accumulation unit 14 and determines the block as one having a motion.

On the other hand, in case where the motion compensated prediction error $E_{MV}(i)$ in the current image frame (t) is smaller than the predetermined threshold value $T_{MV\_error}$, the motion block accumulation unit 14 follows its own determination result on whether the block has a motion or not, and accumulates the number $B_{motion}$ of motion blocks.

Figure 5:
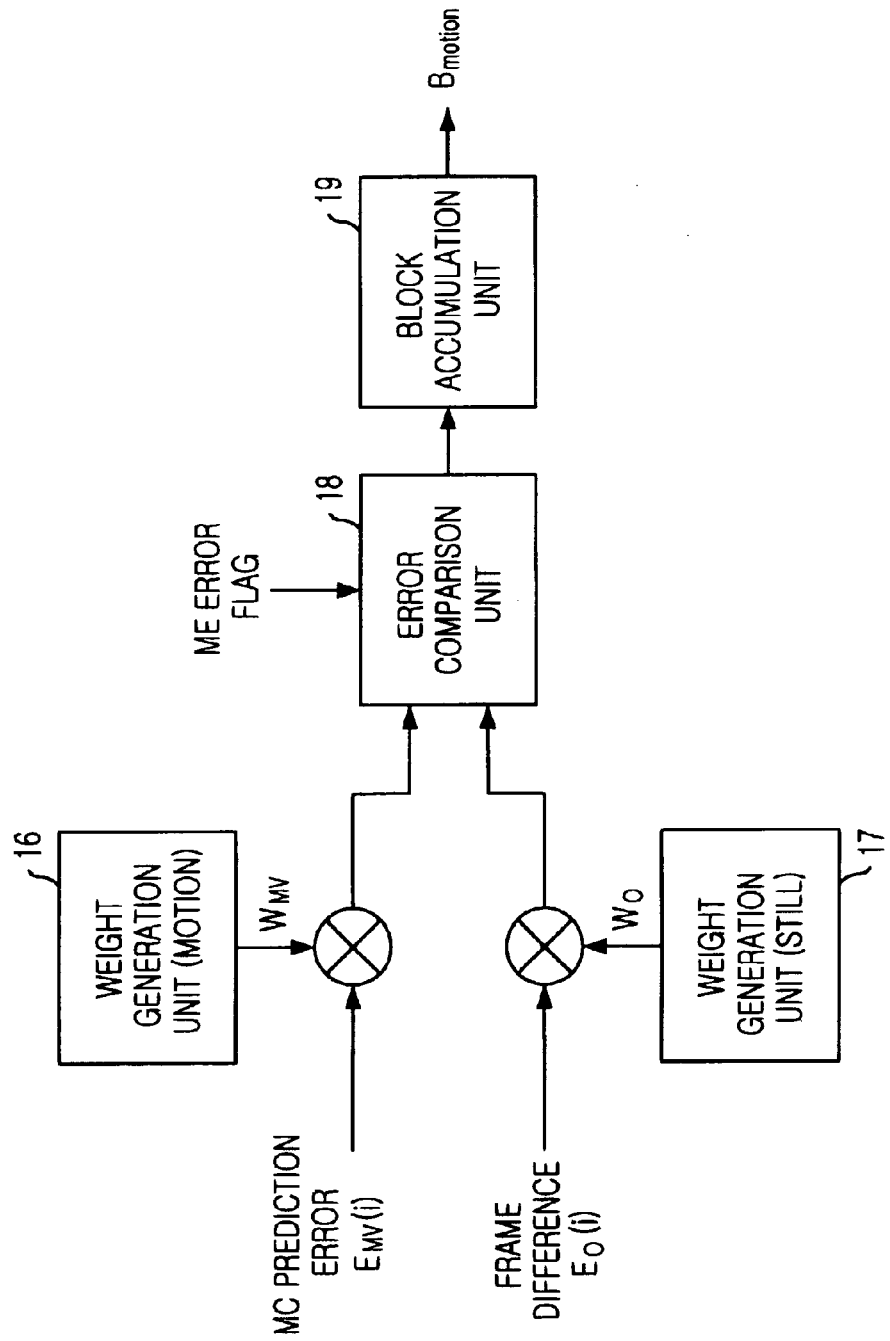
FIG. 5 is a detailed block diagram depicting a motion block accumulation unit of FIG. 4.

FIG. 5 is a detailed block diagram depicting a motion block accumulation unit of FIG. 4. Characteristically, the motion compensated prediction error $E_{MV}(i)$ and the frame difference $E_0(i)$, which is the prediction error that does not consider a motion vector, show a great difference. Therefore, the method of the present invention puts a weight on each error so as to consider the characteristics and environment of an image frame and thus perform more effective motion detection.

That is, in an environment with little noise, although the motion compensated prediction error $E_{MV}(i)$ appears a bit smaller than the frame difference $E_0(i)$ in a block, the block is determined to be a block having a motion, because motion detection can be carried out relatively fine. On the contrary, in case of an environment with a lot of noises, such as at night, or a complicated video, the block can be determined as a block having a motion, only when the motion compensated prediction error $E_{MV}(i)$ is much smaller than the frame difference $E_0(i)$.

This is the reason why the motion block accumulation unit 14 in accordance with the present includes a motion weight generation unit 16 and a still weight generation unit 17, which generate a motion weight $W_{MV}$ and still weight $W_0$, respectively.

The motion weight $W_{MV}$ always has a larger value than the still weight $W_0$. They are multiplied to the motion compensated prediction error $E_{MV}(i)$ and the frame difference $E_0(i)$, which is a prediction error that does not consider a motion vector, respectively, and transmitted to an error comparison unit 18 to be determined if the block has a motion or not.

When the difference between the motion weight $W_{MV}$ and the still weight $W_0$ is small, the motion detection should be performed very delicately. If the difference is large, the motion detection could be performed rather dully. The conditions for determining a block as a motion block in the error comparison unit 18 is shown in an equation 3.

$$W_{MV} \times E_{MV}(i) < W_0 \times E_0(i)\text{:motion block} \qquad \text{Eq. 3}$$

According to the result of the equation 3 of the error comparison unit 18, a block accumulation unit 19 counts the number $B_{motion}$ of motion blocks. When the counting is performed with respect to all the blocks of the current image frame, the resultant value is transmitted to the motion frame determination unit 15.

Meanwhile, the error comparison unit 18 disregards its own determination result on whether the block has a motion or not, and prefers the motion estimation error determination result notified from the motion estimation error determination unit 13, which is a motion estimation error flag. So it determines the block as a motion block.

On the contrary, if the motion compensated prediction error $E_{MV}(i)$ is smaller than the predetermined threshold value $T_{MV\_error}$ in a block of the current image frame (t), the error comparison unit 18 determines whether the block has a motion or not, and it notifies the determination result to the block accumulation unit 19. The block accumulation unit 19 accumulates the number $B_{motion}$ of motion blocks based on the notification of the error comparison unit 18.

With reference to FIG. 4, the motion frame determination unit 15 determines whether the current image frame (t) has a motion or not based on the number $B_{motion}$ of motion blocks within the current image frame (t), which is outputted from the motion block accumulation unit 14. The accumulated number $B_{motion}$ of motion blocks is compared with the predetermined threshold $T_{motion}$. If the accumulated number $B_{motion}$ is larger than the threshold $T_{motion}$, the current image frame is set as a motion image frame, or if it is smaller than the threshold $T_{motion}$, the current image frame is set as a still image frame.

Figure 6:
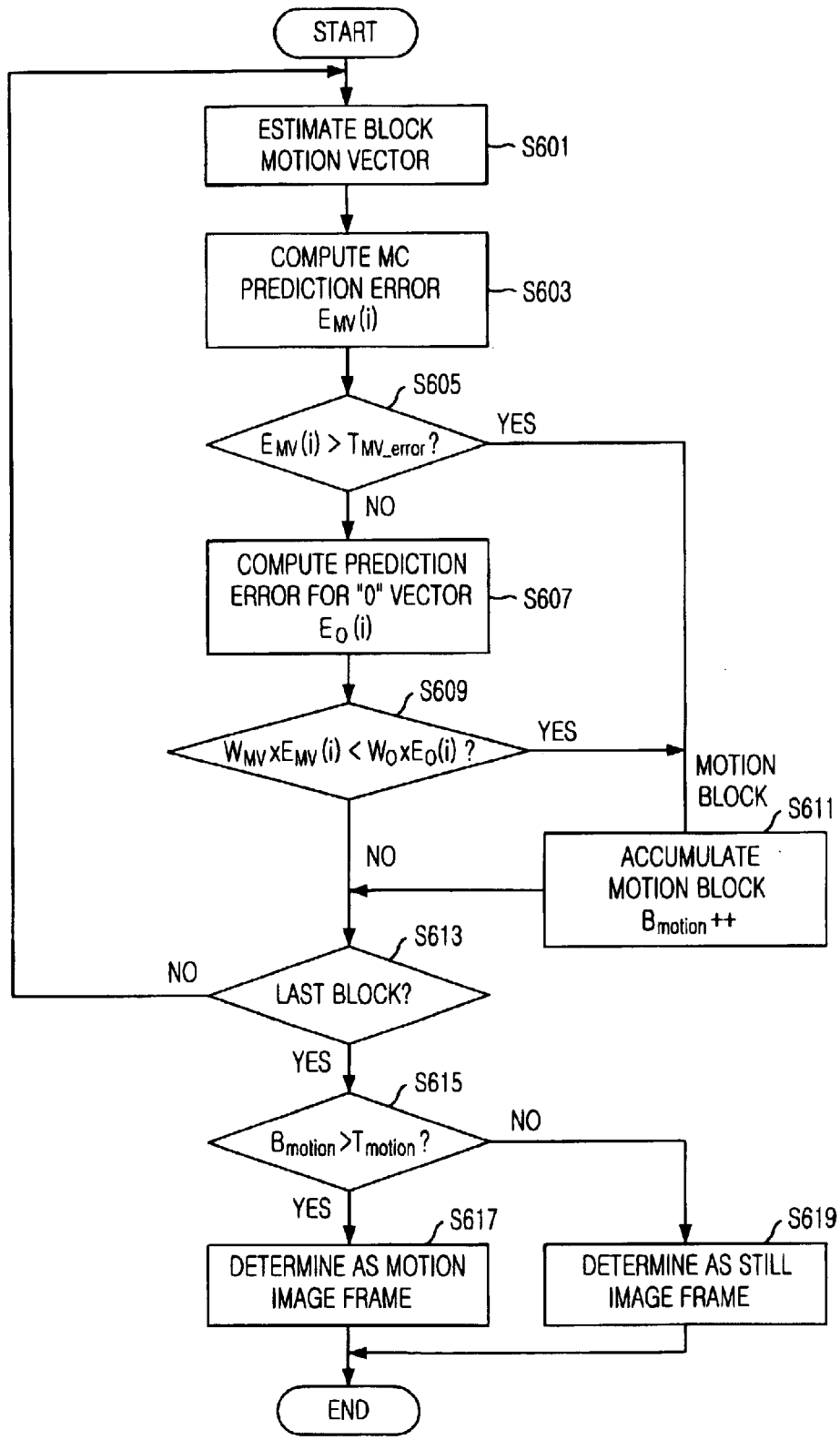
FIG. 6 is a flow chart describing the motion detection process of a video in accordance with an embodiment of the present invention.

FIG. 6 is a flow chart describing the motion detection process of a video in accordance with an embodiment of the present invention.

At step S601, when the reference image frame (t−1) and the current image frame (t) are inputted to the motion detection apparatus of the present invention, as shown in FIG. 6, the ME unit 3 estimates a motion vector on a block basis, based on a predetermined block of the image frame.

At step S603, the MC unit 2 refers to the current image frame and the motion-compensated reference image frame and calculates the motion compensated prediction error $E_{MV}(i)$ with respect to the $i^{th}$ block, by using the motion vector estimated at the step S601.

At step S605, the motion estimation error determination unit 13 determines if the motion compensated prediction error $E_{MV}(i)$, which is calculated in the MC unit 2 at the step S603, is larger than the predetermined threshold value $T_{MV\_error}$, which is predetermined for determining a motion estimation error.

As a result of the step S605, if the motion compensated prediction error $E_{MV}(i)$ is larger than the threshold value $T_{MV\_error}$, the block is determined as a motion block. With respect to the blocks that are determined as motion blocks, a motion estimation error flag is transmitted to the error comparison unit 18.

If the error comparison unit 18 determines a block corresponding to the received motion estimation error flag as a motion block and notifies the result to the block accumulation unit 19. Subsequently, at step S611, the block accumulation unit 19 increases the motion block accumulation parameter $B_{motion}$ by 1, and then, it performs motion detection with respect to the next block.

As a result of the step S605, if the motion compensated prediction error $E_{MV}(i)$ is smaller than the threshold $T_{MV\_error}$, at step S607, the frame difference operation unit 12 calculates the prediction error (i.e., frame difference) $E_0(i)$ with respect to the same location of the reference image frame (t−1) and the current image frame (t) by using the "0" vector, without any consideration for the motion vector of the block.

Subsequently, when the motion block accumulation unit 14 receives the motion compensated prediction errors $E_{MV}(i)$ and $E_0(i)$, which are calculated at the steps S603 and S607, respectively, at step S609, the motion weight generation unit 16 and the still weight generation unit 17 multiply the weights $W_{MV}$ and $W_0$ to the errors $E_{MV}(i)$ and $E_0(i)$, respectively (i.e., $W_{MV} \times E_{MV}(i)$ and $W_0 \times E_0(i)$), and the error comparison unit 18 compares the sizes of the multiplication results.

As a result of the step S609, if the weighted value of motion compensated prediction error ($W_{MV} \times E_{MV}(i)$) is smaller than the weighted prediction error (i.e., weighted frame difference) ($W_0 \times E_0(i)$) that does not consider a motion vector, the error comparison unit 18 determines the block as a motion block, and it notifies the result to the block accumulation unit 19. At step S611, the block accumulation unit 19 increases the block accumulation parameter $B_{motion}$ by 1, and then it performs motion detection with respect to the next block.

As a result of the step S609, if the weighted value of motion compensated prediction error ($W_{MV} \times E_{MV}(i)$) is equal to or larger than the weighted prediction error (i.e., weighted frame difference) ($W_0 \times E_0(i)$) that does not consider a motion vector, the error comparison unit 18 determines the block as a block without any motion, i.e., a still block, and it performs motion detection with respect to the next block.

As described above, when the occurrence of a motion is determined with respect to a block, at step S615, the MC unit 2 checks out the motion detection area to see if there is a block that is not determined if it is a motion block or a still block. If there is a block that still needs to be determined if it is a motion block or a still block, the logic flow returns to the step S601 and repeats the process to the step S611.

As a result of the step S613, all the blocks in the current image frame are determined whether they have a motion or not, at step S615, the motion frame determination unit 15 determines if the number of motion blocks $B_{motion}$, which is accumulated in the block accumulation unit 19 at the step S611, is larger than the predetermined threshold $T_{motion}$ to determine whether the image has a motion. If it is larger than the predetermined threshold $T_{motion}$, at step S617, the current image frame is determined to be a motion image frame. If it is smaller than the predetermined threshold $T_{motion}$, at step S619, the current image frame is determined to be a still image frame, and the logic flow returns.

Figure 7:
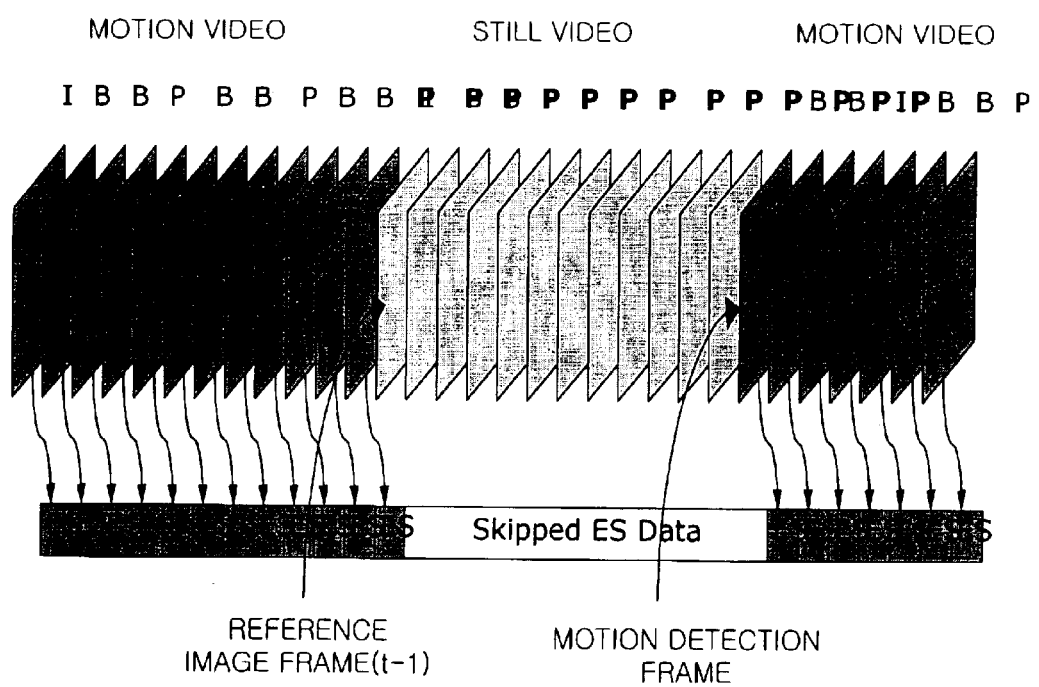
FIG. 7 is a diagram describing a method for establishing an MPEG video encoding mode in the DVR system having a motion detection apparatus of the present, to which the MPEG video compression technique is applied.

FIG. 7 is a diagram describing a method for establishing an MPEG video encoding mode in the DVR system having a motion detection apparatus of the present invention, to which the MPEG video compression technique is applied.

As described above, a motion detection of a single image frame is performed by accumulating all the number $B_{motion}$ of motion blocks of the image frame that are determined to have a motion in the motion block accumulation unit 14 of FIG. 4. If the number of motion blocks is larger than a threshold value $T_{motion}$ predetermined by the user, selecting the image frame as a motion frame.

Through the above process, if the image frame is determined to be an image frame without a motion, the image frame is not compressed and recorded. Then, the motion detection process is performed with respect to the next input image frame. Here, the reference image frame (t−1) is used without change. The encoding mode of the subsequent image frame is set in a P-picture and then the processes of motion detection/compression/recording are performed, instead of applying the initial encoding mode set by the user. This process is repeated on and on, until an input image frame having a motion appears. If an input image frame that is determined to have a motion appears, the image frame is compressed back into the encoding mode set by the user.

The motion detection method of the present invention can be embodied as a program and recorded in a computer-readable recording medium, such as CD-ROM, RAM, ROM, floppy disks, hard disks, optical-magnetic disks and the like.

The technology of the present invention described above is suitable for a DVR system that includes a motion estimator defined in the MPEG standard. It not only uses the brightness values of the image frames, which is widely used, but also considers a motion vector to determine if an image frame has a motion or not, thus detecting an image frames having a motion more precisely. In addition, even when noise is included, it can determine whether a motion has occurred or not precisely by using controlled weights and comparing the weighted motion compensated prediction error and the prediction error that does not consider a motion vector at all.

While the present invention has been described with respect to certain preferred embodiments, it will be apparent to those skilled in the art that various changes and modifications may be made without departing from the scope of the invention as defined in the following claims.

What is claimed is:

1. An apparatus for detecting a motion of an image frame in a digital video recording system having a Moving Picture Expert Group (MPEG) video compression apparatus, comprising:

a motion estimation unit for receiving a reference image frame and a current image frame, and estimating a motion vector (MV=(mx,my)) with respect to a motion of an object in the motion detection area of the image frames based on the received reference image frame and the current image frame;

a motion compensation unit for calculating a motion compensated prediction error $E_{MV}(i)$ based on the estimated motion vector (MV=(mx,my));

a frame difference calculation unit for calculating a frame difference ($E_0(i)$) which is a difference between the reference image frame and the current image frame, the frame difference being an error without motion compensation, with respect to all the blocks included in the motion detection area of the reference image frame, which is not motion-compensated, and the current image frame;

a motion block accumulation unit for accumulating the number ($B_{motion}$) of motion blocks in the current image frame by determining whether a block has a motion or not based on the motion compensated prediction error $E_{MV}(i)$ and the frame difference $E_0(i)$; and a motion frame determination unit for determining whether the current image frame has a motion or not, based on the accumulated number $B_{motion}$ of motion blocks.

2. The apparatus as recited in claim 1, further comprising a motion estimation error determination unit, if the motion compensated prediction error $E_{MV}(i)$ is larger than a predetermined threshold value $T_{MV\_error}$, for transmitting a motion estimation error flag to the motion block accumulation unit to determine the corresponding block as a motion block.

3. The apparatus as recited in claim 1, wherein the motion block accumulation unit includes:

an error comparison unit for determining a block has a motion, if the motion compensated prediction error $E_{MV}(i)$ is smaller than the frame difference $E_0(i)$;

a block accumulation unit for accumulating the number of blocks that are determined to have a motion by the error comparison unit;

a motion weight generation unit for multiplying a predetermined motion weight $W_{MV}$ to the motion compensated prediction error $E_{MV}(i)$ and transmitting a weighted motion compensated prediction error ($W_{MV} \times E_{MV}(i)$) to the error comparison unit; and a still weight generation unit for multiplying a predetermined still weight $W_0$ to the frame difference $E_0(i)$ and transmitting a weighted frame difference ($W_0 \times E_0(i)$) to the error comparison unit, wherein the motion compensated prediction error $E_{MV}(i)$ determined in the error comparison unit is obtained by multiplying the motion weight $W_{MV}$, and the frame difference $E_0(i)$ determined in the error comparison unit is obtained by multiplying the still weight $W_0$.

4. The apparatus as recited in claim 3, wherein the motion weight $W_{MV}$ or the still weight $W_0$ is varied depending on the extent of noise existing in the reference image frame and the current image frame.

5. The apparatus as recited in claim 3, wherein when the motion estimation error flag is transmitted from the motion estimation error determination unit, the error comparison unit determines a block corresponding to the motion estimation error flag as a motion block.

6. The apparatus as recited in claim 1, wherein if the accumulated number $B_{motion}$ of motion blocks is larger than a predetermined threshold value $T_{motion}$, the motion frame determination unit determines the current image frame as a motion frame, or otherwise, the motion frame determination unit determines the current image frame as a still image frame.

7. The apparatus as recited in claim 1, wherein the reference image frame is an image frame right before the current image frame, or if two or more preceding consecutive image frames are determined to be still image frames, the reference image frame is the oldest image frame among the consecutive still image frames.

8. The apparatus as recited in claim 7, wherein the consecutive still image frames are compressed by a P-picture encoding mode.

9. A digital video recording system, comprising a motion detection apparatus, wherein the motion detection apparatus includes a motion estimation unit for receiving a reference image frame and a current image frame, and estimating a motion vector (MV=(mx,my)) with respect to a motion of an object in the motion detection area of the image frames based on the received reference image frame and the current image frame;

a motion compensation unit for calculating a motion compensated prediction error $E_{MV}(i)$ based on the estimated motion vector (MV=(mx,my));

a frame difference calculation unit for calculating a frame difference ($E_0(i)$) which is a difference between the reference image frame and the current image frame, the frame difference being an error without motion compensation, with respect to all the blocks included in the motion detection area of the reference image frame, which is not motion-compensated, and the current image frame;

a motion block accumulation unit for accumulating the number ($B_{motion}$) of motion blocks in the current image frame by determining whether a block has a motion or not based on the motion compensated prediction error $E_{MV}(i)$ and the frame difference $E_0(i)$; and a motion frame determination unit for determining whether the current image frame has a motion or not, based on the accumulated number $B_{motion}$ of motion blocks, wherein an image frame determined to have a motion is compressed/recorded by the motion frame determination unit in the MPEG video compression technique.

10. A method for detecting a motion of an image frame in a digital video recording system having an MPEG video compression apparatus, comprising the steps of:

a) estimating a motion vector (MV=(mx,my)) with respect to a motion of an object in a reference image frame and a current image frame;

b) calculating a motion compensated prediction error $E_{MV}(i)$ based on the estimated motion vector (MV=(mx,my));

c) calculating a frame difference ($E_0(i)$) which is a difference between the reference image frame and the current image frame, which is an error without motion compensation, with respect to all the blocks in the motion detection area of the reference image frame, which is not motion-compensated, and the current image frame;

d) multiplying a predetermined motion weight $W_{MV}$ to the motion compensated prediction error $E_{MV}(i)$ and multiplying a still weight $W_0$ to the frame difference $E_0(i)$;

e) comparing the motion compensated prediction error $E_{MV}(i)$, which is obtained by multiplying the motion weight $W_{MV}$, and the frame difference $E_0(i)$, which is obtained by multiplying the still weight $W_0$;

f) accumulating the number $B_{motion}$ in of motion blocks, if the weighted $W_{MV}$ motion compensated prediction error $E_{MV}(i)$ is smaller than the weighted $W_0$ frame difference $E_0(i)$;

g) repeating the steps a) through e) with respect to a block in the motion detection area of the current image frame; and h) if the accumulated number $B_{motion}$ of the motion blocks is larger than a predetermined threshold value $T_{motion}$, determining the current image frame as a motion frame, or otherwise, determining the current image frame as a still image frame.

11. The method as recited in claim 10, prior to the step c), further comprising the steps of:

h) comparing the motion compensated prediction error $E_{MV}(i)$ and the predetermined threshold value $T_{MV\_error}$; and i) if the motion compensated prediction error $E_{MV}(i)$ is larger than the predetermined threshold value $T_{MV\_error}$, skipping the steps c) and d) and performing the step e).

12. A computer-readable recording medium for recording a program that implements a motion detection method to detect a motion in an input image frame in a digital video recording system provided with a processor and an MPEG video compression apparatus, comprising the steps of:

a) estimating a motion vector (MV=(mx,my)) with respect to a motion of an object in a reference image frame and the current image frame;

b) calculating a motion compensated prediction error $E_{MV}(i)$ based on the estimated motion vector (MV=(mx,my));

c) receiving the reference image frame and the current image frame, and calculating a frame difference $E_0(i)$, which is an error without motion compensation, with respect to all the blocks in the motion detection area of the reference image frame, which is not motion-compensated, and the current image frame;

d) multiplying a predetermined motion weight $W_{MV}$ to the motion compensated prediction error $E_{MV}(i)$ and multiplying a still weight $W_0$ to the frame difference $E_0(i)$;

e) comparing the motion compensated prediction error $E_{MV}(i)$, which is obtained by multiplying the motion weight $W_{MV}$, and the frame difference $E_0(i)$, which is obtained by multiplying the still weight $W_0$;

f) accumulating the number $B_{motion}$ of motion blocks, if the weighted $W_{MV}$ motion compensated prediction error $E_{MV}(i)$ is smaller than the weighted $W_0$ frame difference $E_0(i)$;

g) repeating the steps a) through e) with respect to a block in the motion detection area of the current image frame; and h) if the accumulated number $B_{motion}$ of the motion blocks is larger than a predetermined threshold value $T_{motion}$, determining the current image frame as a motion frame, or otherwise, determining the current image frame as a still image frame.

13. The computer-readable recording medium as recited in claim 12, prior to the step c), further comprising the steps of:

h) comparing the motion compensated prediction error $E_{MV}(i)$ and the predetermined threshold value $T_{MV\_error}$; and i) if the motion compensated prediction error $E_{MV}(i)$ is larger than the predetermined threshold value $T_{MV\_error}$, skipping the steps c) and d) and performing the step e).

* * * * *